United States Patent [19]

Kramer et al.

[11] Patent Number: 5,183,869
[45] Date of Patent: Feb. 2, 1993

[54] HARDENABLE COMPOSITIONS

[75] Inventors: Andreas Kramer, Düdingen; Rudolf Brunner, Belfaux; Abdul-Cader Zahir, Oberwil, all of Switzerland

[73] Assignee: Ciba-Geigy Corporation, Ardsley, N.Y.

[21] Appl. No.: 699,541

[22] Filed: May 14, 1991

[30] Foreign Application Priority Data

May 18, 1990 [CH] Switzerland .......................... 1702/90

[51] Int. Cl.⁵ ............................................. C08F 26/06
[52] U.S. Cl. ................................................... 526/262
[58] Field of Search ........................................ 526/262

[56] References Cited

U.S. PATENT DOCUMENTS

| | | | |
|---|---|---|---|
| 4,100,140 | 7/1978 | Zahir et al. | 526/90 |
| 4,288,583 | 9/1981 | Zahir et al. | 526/262 |
| 4,371,719 | 2/1983 | Zahir et al. | 568/723 |
| 4,812,511 | 3/1989 | Domeier | 524/850 |
| 4,853,449 | 8/1989 | Domeier | 526/259 |

FOREIGN PATENT DOCUMENTS 1139592 12/1968 United Kingdom .
348345 6/1988 United Kingdom .............. 526/262

*Primary Examiner*—Joseph L. Schofer
*Assistant Examiner*—Alex H. Walker
*Attorney, Agent, or Firm*—JoAnn Villamizar

[57] ABSTRACT

Compositions comprising
A) compounds of formula I

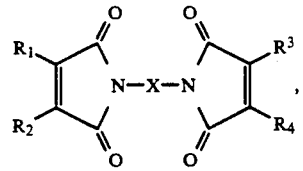

wherein $R_1$, $R_2$, $R_3$ and $R_4$ are identical or different and each is hydrogen or methyl, and X is a divalent organic radical comprising from 2 to 60 carbon atoms, and
B) compounds of formula II

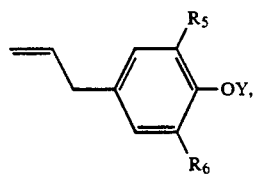

wherein $R_5$ and $R_6$ are identical or different and each, independently of the other, is $C_1$-$C_8$alkyl, and Y is hydrogen or an allyl radical, are distinguished by a favorable processing behaviour and high glass transition temperatures.

12 Claims, No Drawings

HARDENABLE COMPOSITIONS

The present invention relates to compositions comprising bismaleimides and 2,6-dialkyl-4-allylphenols or 2,6-dialkyl-4-allylphenol allyl ethers and to a process for the preparation of hardened products using the compositions according to the invention.

Compositions based on bismaleimides and alkenylphenols are generally known to the person skilled in the art. U.S. Pat. No. 4,100,140 and U.S. Pat. No. 4,288,583 may be cited as examples of such bismaleimide systems. The known hardenable mixtures, however, do not satisfy the stringent requirements, for example regarding processing behaviour, in every respect since they are generally highly viscous mixtures even at the processing temperature. In addition, bismaleimides tend to crystallise out in such systems.

It has now been found that bismaleimide systems modified with 2,6-dialkyl-4-allylphenol or 2,6-dialkyl-4-allylphenol allyl ether have a significantly lower system viscosity, which is advantageous for processing. At elevated temperature, such compositions have a longer, and accordingly more favourable, pot life. It has also been found that the compositions are stable at the processing temperature (from 80° to 130° C.) and also at room temperature, that is to say, the bismaleimide does not crystallise out. Surprisingly, however, it has now also been observed that the hardened products based on the compositions according to the invention have a significantly higher glass transition temperature.

The present invention accordingly relates to compositions comprising

A) compounds of formula I

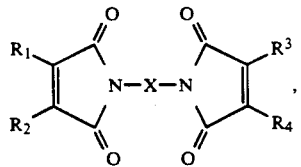

wherein $R_1$, $R_2$, $R_3$ and $R_4$ are identical or different and each is hydrogen or methyl, and X is a divalent organic radical comprising from 2 to 60 carbon atoms, and B) compounds of formula II

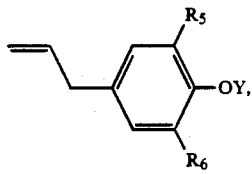

wherein $R_5$ and $R_6$ are identical or different and each, independently of the other, is $C_1$–$C_8$alkyl, and Y is hydrogen or an allyl radical.

The bismaleimides of formula I are known compounds and are described, for example, in U.S. Pat. No. 4,100,140. They are preferably compounds of formula I wherein X is —$(CH_2)_p$—, with p=from 2 to 20, phenylene, xylylene, naphthylene, cyclopentylene, 1,5,5-trimethylcyclohexylene-1,3; cyclohexylene-1,4; 1,4-bis(methylene)cyclohexylene, the radical of 4,4'-bicyclohexylmethane or a group of formula III

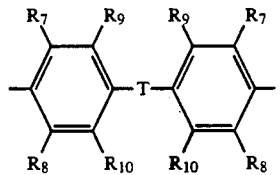

wherein $R_7$ and $R_8$ are identical or different and each is hydrogen or $C_1$–$C_4$alkyl, each of $R_9$ and $R_{10}$, independently of the other, is a hydrogen or halogen atom, and T is methylene, 2,2-propylidene, —CO—, —O—, —S— or —$SO_2$—. Also preferred are compounds of formula I wherein $R_1$, $R_2$, $R_3$ and $R_4$ are hydrogen.

Especially preferred are compounds of formula I wherein X is hexamethylene, trimethylhexamethylene, 1,5,5-trimethylcyclohexylene-1,3; the radical of 4,4'-bicyclohexylmethane or a group of formula III wherein T is methylene, 2,2-propylidene, —O— or —S—.

There are especially used compounds of formula I wherein $R_1$, $R_2$, $R_3$ and $R_4$ are hydrogen and X is a group of formula III wherein $R_7$ and $R_8$ are identical or different and each is hydrogen, methyl or ethyl, $R_9$ and $R_{10}$ are hydrogen and T is methylene.

It is, of course, also possible to use mixtures of two or more different bismaleimides. Preference is given to mixtures of N,N'-4,4'-diphenylmethane bismaleimide and compounds of formula I wherein $R_1$, $R_2$, $R_3$ and $R_4$ are hydrogen and X is a group of formula III wherein $R_7$ and $R_8$ are identical or different and each is methyl or ethyl, $R_9$ and $R_{10}$ are hydrogen and T is methylene. The molar ratio of the unsubstituted to the substituted bismaleimides is in this case preferably from 1:0.8 to 1.2.

Examples of bismaleimides of formula I are: N,N'-ethylene bismaleimide, N,N'-hexamethylene bismaleimide, N,N'-trimethylhexylene bismaleimide, N,N'-m-phenylene bismaleimide, N,N'-4,4'-diphenylmethane bismaleimide, N,N'-4,4'-diphenyl ether bismaleimide, N,N'-(1,5,5-trimethylcyclohexylene-1,3) bismaleimide, N,N'-4,4'-dicyclohexylmethane bismaleimide, N,N'-p-xylylene bismaleimide, N,N'-4,4'-di-(2-ethyl-6-methylphenyl)methane bismaleimide, N,N'-4,4'-di-(2,6-dimethylphenyl)methane bismaleimide, N,N'-4,4'-di-(2,6-thylphenyl)methane bismaleimide, N,N'-4,4'-di-(2,6-diethylphenyl)methane bismaleimide, N,N'-4,4'-di-(2,6-diisopropylphenyl)methane bismaleimide, N,N'-4,4'-di-(2-ethyl-6-isopropylphenyl)methane bismaleimide and N,N'-4,4'-di-(3-chloro-2,6-diethylphenyl)methane bismaleimide.

The preparation of the compounds according to formula I is known and is carried out, for example, by reacting the unsubstituted or substituted maleic acid anhydride with the corresponding diamines. Customary methods are described in U.S. Pat. No. 3,010,290 or GB-PS 1 137 592.

The compounds of formula II are also known compounds. Their preparation is generally known to the person skilled in the art. The 2,6-dialkyl-4-allylphenol allyl ethers are described, for example, in Helv. Chem. Acta 56, 14 (1973).

Compounds of formula II wherein $R_5$ and $R_6$ are methyl and Y is hydrogen or an allyl radical are preferred.

Examples of suitable phenols are 2,6-dimethyl-4-allylphenol, 2,6-diethyl-4-allylphenol, 2,6-dipropyl-4-allylphenol, 2,6-diisopropyl-4-allylphenol, 2,6-di-(1-methylpropyl)-4-allylphenol, 2,6-diisobutyl-4-allylphenol and 2,6-dihexyl-4-allylphenol as well as the allyl ethers of those compounds.

In general, the compositions according to the invention comprise, per mole of component A, from 0.027 to 1.15 mol, preferably from 0.045 to 0.9 mol, of component B.

The mixtures according to the invention may also comprise alkenylphenols of formula IV, V or VI:

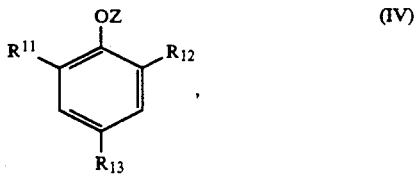

wherein each of $R_{11}$, $R_{12}$ and $R_{13}$, independently of the others, is a hydrogen atom or a $C_3$–$C_{10}$alkenyl group, at least one of the radicals $R_{11}$ to $R_{13}$ being an alkenyl group, and Z is hydrogen, $C_1$–$C_{10}$alkyl, $C_6$–$C_{10}$aryl or $C_3$–$C_{10}$alkenyl,

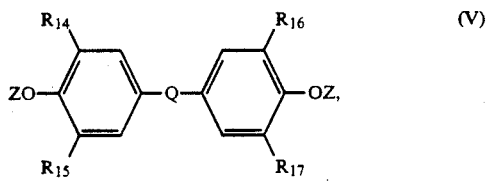

wherein Q is a direct bond, methylene, 2,2-propylidene, —CO—, —O—, —S—, —SO— or —SO$_2$— and each of $R_{14}$, $R_{15}$, $R_{16}$ and $R_{17}$, independently of the others, is a hydrogen atom or a $C_3$–$C_{10}$alkenyl group, at least one of the radicals $R_{14}$ to $R_{17}$ being an alkenyl group, and Z is hydrogen, $C_1$–$C_{10}$alkyl, $C_6$–$C_{10}$aryl or $C_3$–$C_{10}$alkenyl, or

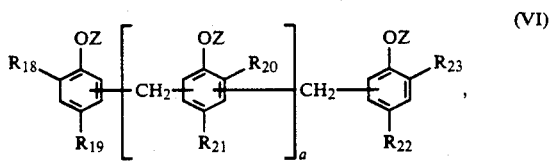

wherein each of $R_{18}$, $R_{19}$, $R_{20}$, $R_{21}$, $R_{22}$ and $R_{23}$, independently of the others, is a hydrogen atom, $C_1$–$C_4$alkyl or $C_3$–$C_{10}$alkenyl, at least one of the radicals $R_{18}$ to $R_{23}$ being an alkenyl group, and a is a number from 0 to 10, and Z is hydrogen, $C_1$–$C_{10}$alkyl, $C_6$–$C_{10}$aryl or $C_3$–$C_{10}$alkenyl.

The compounds of formulae IV to VI preferably comprise an allyl, methallyl or 1-propenyl radical as alkenyl group.

Of the compounds of formulae IV to VI, there are preferably used in the compositions according to the invention compounds of formula V wherein Q is methylene, 2,2-propylidene, —O—, —S—, —CO— or —SO$_2$—, each of $R_{14}$ and $R_{16}$ is an allyl radical and each of $R_{15}$ and $R_{17}$ is a hydrogen atom, and Z is hydrogen.

Alkenylphenols of formula V wherein Q is 2,2-propylidene, each of $R_{14}$ and $R_{16}$ is an allyl radical and each of $R_{15}$ and $R_{17}$ is a hydrogen atom, and Z is hydrogen are especially preferred.

The compositions according to the invention generally comprise, per mole of alkenylphenyl, from 0.1 to 2 mol, preferably from 0.2 to 0.5 mol, of component B.

Examples of alkenyl-substituted phenols and polyols are, for example, o,o'-diallyl bisphenol A, 4,4'-dihydroxy-3,3'-diallylbiphenyl, bis(4-hydroxy-3-allylphenyl)methane, 2,2-bis(4-hydroxy-3,5-diallylphenyl)propane, eugenol (4-allyl-2-methoxyphenol), o,o'-dimethyllyl bisphenol A, 4,4'-dihydroxy-3,3'-dimethallylbiphenyl, bis(4-hydroxy-3-methallylphenyl)methane, 2,2-bis(4-hydroxy-3,5-dimethallylphenyl)propane, 4-methallyl-2-methoxyphenol, 2,2-bis(4-methoxy-3-allylphenyl)propane, 2,2-bis(4-methoxy-3-methallylphenyl)propane, 4,4'-dimethoxy-3,3'-diallylbiphenyl, 4,4'-dimethoxy-3,3'-dimethallylbiphenyl, bis(4-methoxy-3-allylphenyl)methane, bis(4-methoxy-3-methallylphenyl)methane, 2,2-bis(4-methoxy-3,5-diallylphenyl)propane, 2,2-bis(4-methoxy-3,5-dimethallylphenyl)propane, 4-allylveratrole (4-allyl-1,2-dimethoxybenzene) and 4-methallylveratrole (4-methallyl-1,2-dimethoxybenzene).

The preparation of the alkenylphenols is known and is effected, for example, by reacting the corresponding phenols and, for example, allyl chloride in the presence of an alkali metal hydroxide in a suitable solvent, the products obtained then being subjected to a Claisen rearrangement. Methods of that type are described, for example, in U.S. Pat. Nos. 4,100,140 and 4,288,583.

The compositions according to the invention can be prepared simply by mixing the components together, or by heating the composition at from 75° to 140° C. for approximately from 15 to 60 minutes. In order to facilitate the reaction, it is also possible optionally to use solvents, especially volatile solvents, such as chlorinated hydrocarbons, esters, ether alcohols or tetrahydrofuran. The solvent is removed after the reaction.

The hardening of the compositions according to the invention generally takes place at temperatures of from 100° to 300° C. for a period sufficient to achieve hardening.

During hardening, a network is formed with a high cross-linking density. The term "hardening" used here accordingly denotes the conversion of the low-viscosity resin mixtures into insoluble and non-metable cross-linked products. High-performance materials can thus be produced, such as, for example, fibre-reinforced composites, structural adhesives, laminating resins or electroresins, which can be exposed to high temperatures.

In any processing phase before hardening, the compositions according to the invention can be mixed with customary modifiers, such as, for example, extenders, fillers and reinforcing agents, pigments, dyestuffs, organic solvents, plasticisers, agents for improving the dry-tackiness, (tackifiers), gums or accelerators. Suitable extenders, reinforcing agents, fillers and pigments are, for example: coal-tar, bitumen, glass fibres, boron fibres, carbon fibres, cellulose, polyethylene powder, polypropylene powder, mica, asbestos, quartz powder, gypsum, antimony trioxide, bentonites, silicon dioxide aerogel ("Aerosil"), lithopone, barite, titanium dioxide, carbon black, graphite, iron oxide or metal powders, such as, for example, aluminium or iron powder. Other customary additives, such as, for example, flame retardants, thixotropic agents, flow control agents, such as silicones, cellulose acetate butyrate, polyvinyl butyrate, waxes, stearates and the like (which can in some cases also be used as mould release agents) may also be added to the hardenable mixtures.

The hardenable compositions can be prepared in customary manner using known mixing units, such as stirrers, kneaders, roller bodies and the like.

The compositions according to the invention are distinguished by a very good processing behavior, good solubility in customary organic solvents, good stability in the melt or in solution and by good thermal and mechanical properties of the hardened products. The products obtained also have good electrical properties, have high glass transition temperatures and are not brittle. The compositions according to the invention can also be used without difficulty as melts, for example for impregnation.

The present invention accordingly relates also to a process for the preparation of hardened products using the compositions according to the invention.

The described compositions according to the invention can be used in various fields, such as, for example, in prepregs, laminates, composites, printed circuit boards, castings, moulded articles, adhesives and coatings. Their use in the manufacture of fibre-reinforced composites, which are very important in the aeronautical industry, is of particular interest. For example, the modified resins can be used to preimpregnate various fibrous materials that are used as honeycomb skins or as structural parts. Processes for the manufacture of prepregs are known to the person skilled in the art. There may be used as fibrous materials, for example, graphite, glass and Kevlar. Processes for the manufacture of laminates are also known. Laminates of various thicknesses can be manufactured, for example, by compression moulding or autoclave moulding. The mixtures according to the invention can also be used successfully as adhesion-promoters.

Some preferred embodiments of the present invention are described in the following Examples.

EXAMPLE 1

A mixture of 100 g of N,N'-4,4'-diphenylmethane bismaleimide, 65.4 g of o,o'-diallyl bisphenol A and 10 g of 2,6-dimethyl-4-allylphenol is melted at from 120° to 130° C. A homogeneous mixture which is highly viscous at room temperature and having $\eta_{100}=190$ mPa.s and a gelling time of 28 minutes at 160° C. is obtained.

The resin composition, which exhibits low viscosity at 120° C., is poured into a metal mould 4 mm thick and hardened for 1 hour at 180° C., for 2 hours at 200° C. and for 6 hours at 250° C. After cooling, the transparent polymer plate is cut into test rods using which the following properties are measured:

| | |
|---|---|
| $T_{g\ onset}$: | 315° C. |
| flexural strength: (in accordance with ISO 178) | 187 MPa |
| edge fibre elongation: (in accordance with ISO 178) | 7.2% |

[$T_{g\ onset}$ is the point of intersection of the extended base line with the tangent at the measuring curve in the area of the steepest rise (measured using TMA, Mettler TA 3000)]

EXAMPLE 2

A mixture of 100 g of N,N'-4,4'-diphenylmethane bismaleimide, 56.0 g of o,o'-diallyl bisphenol A and 12.4 g of 2,6-dimethyl-4-allylphenol allyl ether is melted at from 120° C. to 130° C. A homogeneous mixture which is highly viscous at room temperature and having $\eta_{100}=140$ mPa.s and a gelling time of 31 minutes at 160° C. is obtained.

The resin composition, which exhibits low viscosity at 120° C., is poured into a metal mould 4 mm thick and hardened for 1 hour at 180° C., for 2 hours at 200° C. and for 6 hours at 250° C. After cooling, the transparent polymer plate is cut into test rods using which the following properties are measured:

| | |
|---|---|
| $T_{g\ onset}$: | 317° C. |
| flexural strength: (in accordance with ISO 178) | 166 MPa |
| edge fibre elongation: (in accordance with ISO 178) | 5.2% |

EXAMPLE 3

A mixture of 100 g of N,N'-4,4'-diphenylmethane bismaleimide, 62.8 g of o,o'-diallyl bisphenol A and 16.4 g of 2,6-dimethyl-4-allylphenol allyl ether is melted at from 120° to 130° C. A homogeneous mixture which is highly viscous at room temperature and having $\eta_{100}=90$ mPa.s and a gelling time of 31 minutes at 160° C. is obtained.

The resin composition, which exhibits low viscosity at 120° C., is poured into a metal mould 4 mm thick and hardened for 1 hour at 180° C., for 2 hours at 200° C. and for 6 hours at 250° C. After cooling, the transparent polymer plate is cut into test rods using which the following properties are measured:

| | |
|---|---|
| $T_{g\ onset}$: | 326° C. |
| flexural strength: (in accordance with ISO 178) | 153 MPa |
| edge fibre elongation: (in accordance with ISO 178) | 5.2% |

EXAMPLE 4

A mixture of 50 g of N,N'-4,4'-diphenylmethane bismaleimide, 50 g of N,N'-4,4'-di-(2-ethyl-6-methylphenyl)methane bismaleimide, 58 g of o,o'-diallyl bisphenol A and 10 g of 2,6-dimethyl-4-allylphenol allyl ether is melted at from 120° to 130° C. A homogeneous mixture which is highly viscous at room temperature and having $\eta_{100}=200$ mPa.s and a gelling time of 31 minutes at 160° C. is obtained.

The resin composition, which exhibits low viscosity at 120° C., is poured into a metal mould 4 mm thick and hardened for 1 hour at 180° C., for 2 hours at 200° C. and for 6 hours at 250° C. After cooling, the transparent polymer plate is cut into test rods using which the following properties are measured:

| | |
|---|---|
| $T_{g\ onset}$: | 294° C. |
| flexural strength: (in accordance with ISO 178) | 144 MPa |
| edge fibre elongation: (in accordance with ISO 178) | 4.8% |

What is claimed is:
1. A composition comprising:
   (A) a compound of formula I

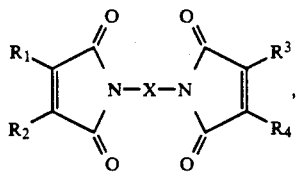

wherein $R_1$, $R_2$, $R_3$ and $R_4$ are identical or different and each is hydrogen or methyl, and X is a divalent organic radical comprising 2 to 60 carbon atoms,
(B) a compound of formula II

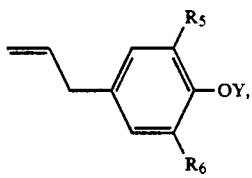

wherein $R_5$ and $R_6$ are identical or different and each, independently of the other, is $C_1$-$C_8$alkyl, and Y is hydrogen or an allyl radical, and
(C) an alkenylphenol of formula IV, V or VI

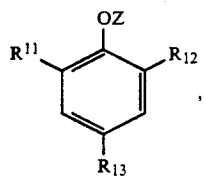

wherein each of $R_{11}$, $R_{12}$ and $R_{13}$, independently of the others, is a hydrogen atom or a $C_3$-$C_{10}$alkenyl group, at least one of the radicals $R_{11}$ to $R_{13}$ being an alkenyl group, and Z is hydrogen, $C_1$-$C_{10}$alkyl, $C_6$-$C_{10}$aryl or $C_3$-$C_{10}$alkenyl,

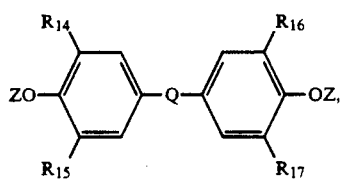

wherein Q is a direct bond, methylene, 2,2-propylidene, —CO—, —O—, —S—, —SO— or —$SO_2$—, and each of $R_{14}$, $R_{15}$, $R_{16}$ and $R_{17}$, independently of the others, is a hydrogen atom or a $C_3$-$C_{10}$alkenyl group, at least one of the radicals $R_{14}$ to $R_{17}$ being an alkenyl group, and Z is hydrogen, $C_1$-$C_{10}$alkyl, $C_6$-$C_{10}$aryl or $C_3$-$C_{10}$alkenyl,

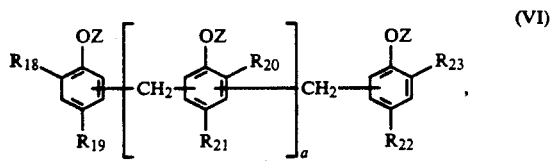

wherein each of $R_{18}$, $R_{19}$, $R_{20}$, $R_{21}$, $R_{22}$ and $R_{23}$, independently of the others, is a hydrogen atom, $C_1$-$C_4$alkyl or $C_3$-$C_{10}$alkenyl, at least one of the radicals $R_{18}$ to $R_{23}$ being an alkenyl group, and a is a number from 0 to 10, and Z is hydrogen, $C_1$-$C_{10}$alkyl, $C_6$-$C_{10}$aryl or $C_3$-$C_{10}$alkenyl.

2. A composition according to claim 1 comprising a compound of formula I wherein X is —$(CH_2)_p$—, with p=from 2 to 20, phenylene, xylylene, naphthylene, cyclopentylene, 1,5,5-trimethylcyclohexylene-1,3; cyclohexylene-1,4; 1,4-bis(methylene)cyclohexylene, the radical of 4,4'-bicyclohexylmethane or a group of formula III

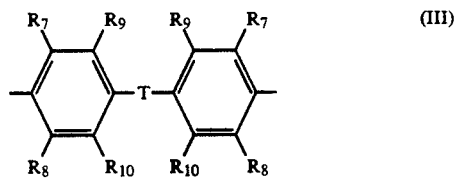

wherein $R_7$ and $R_8$ are identical or different and each is hydrogen or $C_1$-$C_4$alkyl, each of $R_9$ and $R_{10}$, independently of the other, is a hydrogen or halogen atom, and T is methylene, 2,2-propylidene, —CO—, —O—, —S— or —$SO_2$—.

3. A composition according to claim 1 comprising a compound of formula I wherein $R_1$, $R_2$, $R_3$ and $R_4$ are hydrogen.

4. A composition according to claim 1 comprising a compound of formula I wherein X is hexamethylene, trimethylhexamethylene, 1,5,5-trimethylcyclohexylene-1,3; the radical of 4,4'-bicyclohexylmethane or a group of formula III where T is methylene, 2,2-propylidene, —O— or —S—.

5. A composition according to claim 1 comprising a compound of formula I wherein $R_1$, $R_2$, $R_3$ and $R_4$ are hydrogen and X is a group of formula III wherein $R_7$ and $R_8$ are identical or different and each is hydrogen, methyl or ethyl, $R_9$ and $R_{10}$ are hydrogen and T is methylene.

6. A composition according to claim 1 comprising a compound of formula II wherein $R_5$ and $R_6$ are methyl and Y is hydrogen or an allyl radical.

7. A composition according to claim 1 comprising, per mole of component A, from 0.027 to 1.15 mol, preferably from 0.045 to 0.9 mol, of component B.

8. A composition according to claim 1 wherein, in the formulae IV to VI, the alkenyl group is an allyl, methallyl or 1-propenyl group.

9. A composition according to claim 1 comprising an alkenylphenol of formula V wherein Q is methylene, 2,2-propylidene, —O—, —S—, —CO— or —$SO_2$—, each of $R_{14}$ and $R_{16}$ is an allyl radical and each of $R_{15}$ and $R_{17}$ is a hydrogen atom, and Z is hydrogen.

10. A composition according to claim 1 comprising an alkenylphenol of formula V wherein Q is 2,2-propylidene, each of $R_{14}$ and $R_{16}$ is an allyl radical and each of $R_{15}$ and $R_{17}$ is a hydrogen atom, and Z is hydrogen.

11. A composition according to claim 1 comprising, per mole of alkenylphenol, from 0.1 to 2 mol, preferably from 0.2 to 0.5 mol, of component B.

12. A process for the preparation of hardened products using a composition according to claim 1.

* * * * *